(12) United States Patent
Horiike et al.

(10) Patent No.: US 9,028,177 B2
(45) Date of Patent: May 12, 2015

(54) ROUGHING END MILL AND INSERT FOR A ROUGHING END MILL

(75) Inventors: Nobukazu Horiike, Tsukuba (JP); Jun Kitajima, Tsukuba (JP)

(73) Assignee: Mitsubishi Materials Corporation, Tokyo (JP)

( * ) Notice: Subject to any disclaimer, the term of this patent is extended or adjusted under 35 U.S.C. 154(b) by 517 days.

(21) Appl. No.: 12/440,992

(22) PCT Filed: Sep. 13, 2007

(86) PCT No.: PCT/JP2007/067822
§ 371 (c)(1),
(2), (4) Date: Mar. 12, 2009

(87) PCT Pub. No.: WO2008/032776
PCT Pub. Date: Mar. 20, 2008

(65) Prior Publication Data
US 2010/0061813 A1 Mar. 11, 2010

(30) Foreign Application Priority Data

Sep. 13, 2006 (JP) .................................. 2006-248174

(51) Int. Cl.
*B23P 15/42* (2006.01)
*B26D 1/12* (2006.01)
(Continued)

(52) U.S. Cl.
CPC ................. *B23C 5/109* (2013.01); *B23C 5/207* (2013.01); *B23C 2200/206* (2013.01); *B23C 2210/66* (2013.01); *B23C 2220/60* (2013.01)

(58) Field of Classification Search
CPC ............ B23C 5/207; B23C 5/10; B23C 5/18; B23C 5/109; B23C 5/06; B23C 2200/205; B23C 2200/0416; B23C 2210/28; B23C 2210/287

USPC ............... 407/17, 18, 19, 21, 40, 42, 55, 113, 407/114, 115, 116
See application file for complete search history.

(56) References Cited

U.S. PATENT DOCUMENTS 1,472,960 A * 11/1923 Conklin ........................... 407/29
1,840,852 A * 1/1932 Schotthoefer ................... 407/61
(Continued)

FOREIGN PATENT DOCUMENTS

CN          87205072 U      4/1988
FR            2183362        12/1973
(Continued)

OTHER PUBLICATIONS

European Search Repoprt mailed Nov. 24, 2010 for the corresponding European application No. 07807229.5.
(Continued)

*Primary Examiner* — Kenneth E. Peterson
*Assistant Examiner* — Samuel A Davies
(74) *Attorney, Agent, or Firm* — Leason Ellis LLP.

(57) ABSTRACT

A roughing end mill comprises an end mill body and plural inserts which are placed on an outer circumference of the end mill body with a predetermined distance apart from each other in the axial direction of the end mill body, wherein the plural inserts form plural insert rows which are provided in a circumferential direction of the end mill body, where the inserts are offset in the axial direction from each other between the different insert rows which are adjacent in the circumferential direction. The inserts have waveform cutting edges which face towards an outer circumferential side of the end mill body. One insert of one insert row and an insert of another insert row are positioned such that the waveform cutting edges of each of these inserts make up a waveform cutting edge row whose phase is continuous on a rotation trajectory around the axis.

7 Claims, 11 Drawing Sheets

(51) Int. Cl.
  *B23C 5/10* (2006.01)
  *B23C 5/20* (2006.01)

(56) References Cited

U.S. PATENT DOCUMENTS

| | | | | |
|---|---|---|---|---|
| 3,574,251 | A * | 4/1971 | Corti | 407/45 |
| 3,574,911 | A * | 4/1971 | Penoyar | 407/114 |
| 3,875,631 | A | 4/1975 | Malinchak | |
| 3,922,766 | A * | 12/1975 | Malinchak | 407/40 |
| 4,093,392 | A * | 6/1978 | Hopkins | 407/48 |
| 4,140,431 | A * | 2/1979 | Friedline et al. | 407/114 |
| 4,182,587 | A * | 1/1980 | Striegl | 407/113 |
| 4,215,955 | A | 8/1980 | Lillie | |
| 4,248,553 | A * | 2/1981 | Kraemer | 407/114 |
| 4,681,486 | A * | 7/1987 | Hale | 407/114 |
| 4,794,665 | A * | 1/1989 | Peters | 407/58 |
| 4,812,087 | A * | 3/1989 | Stashko | 407/42 |
| 4,844,666 | A * | 7/1989 | Tsujimura et al. | 407/34 |
| 4,936,719 | A | 6/1990 | Peters | |
| 5,007,775 | A * | 4/1991 | Pantzar | 407/113 |
| 5,083,887 | A * | 1/1992 | Dotany | 407/59 |
| 5,158,401 | A * | 10/1992 | Pawlik | 407/40 |
| 5,168,907 | A * | 12/1992 | Herrington et al. | 144/228 |
| 5,382,118 | A * | 1/1995 | Satran et al. | 407/42 |
| 5,437,522 | A * | 8/1995 | Satran et al. | 407/42 |
| 5,688,081 | A | 11/1997 | Paya | |
| 5,772,365 | A | 6/1998 | Vogel et al. | |
| 5,810,520 | A * | 9/1998 | Hintze et al. | 407/114 |
| 5,876,154 | A | 3/1999 | Enderle | |
| 5,904,449 | A * | 5/1999 | Satran et al. | 407/59 |
| 5,913,644 | A * | 6/1999 | DeRoche et al. | 407/42 |
| 5,944,456 | A * | 8/1999 | Shirley et al. | 407/42 |
| 5,947,649 | A * | 9/1999 | Arai et al. | 407/34 |
| 6,149,355 | A | 11/2000 | Fouquer et al. | |
| 6,530,726 | B2 * | 3/2003 | Nelson | 407/114 |
| 6,599,061 | B1 * | 7/2003 | Nelson | 407/114 |
| 6,619,891 | B2 * | 9/2003 | Hansson et al. | 407/35 |
| 6,811,359 | B2 | 11/2004 | Craig | |
| 6,913,426 | B2 * | 7/2005 | Horiike et al. | 407/113 |
| 6,976,811 | B1 * | 12/2005 | DeRoche et al. | 407/56 |
| 7,252,461 | B2 * | 8/2007 | Karonen | 407/113 |
| 7,275,896 | B2 * | 10/2007 | Nudelman | 407/114 |
| 7,393,161 | B2 * | 7/2008 | Sjogren | 407/113 |
| 7,604,441 | B2 * | 10/2009 | Bhagath | 407/113 |
| 7,993,082 | B2 | 8/2011 | Horiike et al. | |
| 2003/0223829 | A1* | 12/2003 | Craig | 407/40 |
| 2005/0207852 | A1* | 9/2005 | Horiike et al. | 407/48 |
| 2009/0290946 | A1* | 11/2009 | Zastrozynski | 407/114 |
| 2010/0047026 | A1* | 2/2010 | Horiike et al. | 407/40 |

FOREIGN PATENT DOCUMENTS

| | | | |
|---|---|---|---|
| GB | 1207782 | 10/1970 | |
| GB | 1442215 | 7/1976 | |
| JP | 49-85677 | 8/1974 | |
| JP | 53-69892 | 6/1978 | |
| JP | 55-54115 | 4/1980 | |
| JP | 55-179719 | 12/1980 | |
| JP | 60-186116 | 12/1985 | |
| JP | A-63-034010 | 2/1988 | |
| JP | A-06-074219 | 10/1994 | |
| JP | A-07-299636 | 11/1995 | |
| JP | 08-001426 | * 1/1996 | B23C 5/10 |
| JP | 08-001427 | 1/1996 | |
| JP | A-09-057519 | 3/1997 | |
| JP | 09057519 | * 4/1997 | B23C 5/10 |
| JP | 2001-121340 A | 5/2001 | |
| JP | 2002-233910 A | 8/2002 | |
| JP | 2003-25135 | 1/2003 | |
| JP | A-2003-251516 | 9/2003 | |
| JP | A-2005-131788 | 5/2005 | |
| JP | 2006-239830 | 9/2006 | |
| WO | WO-A1-2005/080038 | 9/2005 | |
| WO | WO-A1-2006/035910 | 4/2006 | |

OTHER PUBLICATIONS

Chinese Office Action issued May 11, 2010 for the corresponding Chinese Patent Application No. 200780033600.6.
European Search Report Issued on Nov. 22, 2010 for the corresponding European application No. 07807233.7.
U.S. Office Action mailed May 11, 2011 for the related U.S. Appl. No. 12/440,970.
International Search Report for the PCT Application No. PCT/JP2007/067822, issued Nov. 20, 2007.
International Search Report for the PCT Application No. PCT/JP2007/067826, issued Nov. 20, 2007.
International Search Report for the PCT Application No. PCT/JP2007/067851, issued Nov. 27, 2007.
Chinese Office Action for the Chinese Application No. 200780033711.7, issued Jan. 22, 2010.
European Search Report for the European Application No. 07807258.4, issued Nov. 19, 2010.
U.S, Office Action for the related U.S. Appl. No. 12/440,845, issued Sep. 29, 2010.
U.S. Office Action for the related U.S. Appl. No. 13/177,869, issued Nov. 9, 2011.
Office Action mailed Jan. 23, 2012 for the related U.S. Appl. No. 12/440,970.
Office Action of Japanese Application No. 2006-295907 mailed Nov. 22, 2011.
Office Action of Japanese Application No. 2006-295906 mailed Dec. 13, 2011.
Office Action mailed Jun. 20, 2013 for the corresponding Korean Patent Application No. 10-2009-7004784.
Office Action mailed Jun. 20, 2013 for the related Korean Patent Application No. 10-2009-7004587.

* cited by examiner

ROUGHING END MILL AND INSERT FOR A ROUGHING END MILL

CROSS REFERENCE TO PRIOR APPLICATION

This is the U.S. National Phase Application under 35 U.S.C. §371 of International Patent No. PCT/JP2007/067822 filed Sep. 13, 2007, which claims the benefit of Japanese Patent Application No. 2006-248174 filed Sep. 13, 2006. The International Application was published in Japanese on Mar. 20, 2008 as International Patent Application No. WO/2008/032776 under PCT Article 21(2), and all preceding applications are incorporated herein in their entirety.

TECHNICAL FIELD

The present invention relates to a roughing end mill which has a plurality of inserts removably mounted on an outer circumference of an end mill body, and to an insert for a roughing end mill (referred to below simply as an 'insert') which is mounted on this roughing end mill.

BACKGROUND ART OF THE INVENTION

Roughing end mills equipped with replaceable inserts have been proposed, for example, in Patent documents 1 and 2. In these roughing end mills, a plurality of twisted grooves are formed in an outer circumference of a circular column-shaped tool body, and square plate-shaped inserts are fitted inside these twisted grooves with a slight gap between each insert. The inserts are positioned substantially equidistantly in the twisted grooves such that the inserts of each twisted groove cover the gaps between the inserts in the other twisted grooves. Here, four twisted grooves are formed in the roughing end mill described in Patent document 1, with the first and third twisted grooves being the same as each other and the second and fourth twisted grooves being the same as each other. In addition, first inserts which substantially overlap a rotation outer edge of the first inserts in the first and third twisted grooves are placed at a distal end side of second inserts of the second and fourth twisted grooves.

Moreover, in the roughing end mill proposed in Patent document 2, three twisted grooves are formed therein, with the second and third twisted grooves being the same as each other. In addition, first inserts which substantially overlap at a rotation outer edge of the first inserts in the first twisted groove are located at a distal end side of second inserts of the second and third twisted grooves. According to the roughing end mills of Patent documents 1 and 2, by suppressing tool damage by making the distal end cutting edges twice as large as the outer circumferential cutting edges, the outer circumferential cutting edges are divided, the cut off chips are fragmented and the cutting force becomes dispersed. As a result, vibration is suppressed and superior cutting is achieved.

PATENT DOCUMENT 1: Japanese Patent Application, First Publication No. H08-1426

PATENT DOCUMENT 2: Japanese Patent Application, First Publication No. H08-1427

DETAILED DESCRIPTION OF THE INVENTION

Problems to be Solved by the Invention

However, in the roughing end mills described in Patent documents 1 and 2, the inserts themselves are simply square plate-shaped objects having rectilinear cutting edges. Accordingly, the width of the fragmented chips is also made to match the length of the cutting edges and the size of the gaps between the inserts in the aforementioned twisted grooves. Because of this, it is not possible to sufficiently fragment the chips and reduce resistance, or to soften the bite impact of the cutting edges.

Therefore, the inventors of the present invention earlier proposed in Japanese Patent Publication No. 2005-60513 inserts in which raised portions and recessed portions are formed alternatingly at substantially equal intervals so as to intersect in a cutting edge such that the cutting edge is formed in a waveform shape when seen in side view and plan view, and a rough end mill in which these inserts are mounted in mounting seats which are provided equidistantly a predetermined distance apart in one chip pocket (i.e., a chip removal groove), and in mounting seats which are provided in another chip pocket so as to be positioned between the first mounting seats in the axial direction, so that an elongated blade form is formed on the outer circumference of the end mill by the cutting edges of these inserts. Accordingly, according to this type of roughing end mill, when a cutting edge bites into a work piece, the entire length of that cutting edge does not all bite at the same time, and the work piece is bitten into gradually by the respective raised portions of the waveform. In addition, because the chips are cut into smaller fragments than the length of the cutting edges, it is possible to achieve both a sufficient impact softening and resistance reduction, and a greater improvement in the chip processability.

However, in a roughing end mill in which are mounted inserts whose cutting edges have been shaped into a waveform in this manner, for each cutting edge, the processing surface of a work piece is formed in an opposite-phase cross-sectional waveform corresponding to the phase of the waveform presented by that cutting edge. Accordingly, when inserts are placed equidistantly in each of the identical first and third twisted grooves and in each of the identical second and fourth twisted grooves, as in the roughing end mill described, for example, in Patent document 1, or when inserts are placed equidistantly in the identical second and third twisted grooves, as is the case in the roughing end mill described in Patent document 2, because the phases of the waveform cutting edges match each other in these identical twisted grooves, the gap portions between inserts in these identical twisted grooves are only cut by the waveform cutting edge of the other identical twisted grooves which has a matching phase, so that a processing surface having a waveform cross section of the aforementioned opposite phase is left on the work piece, and in spite of the fact that this is only rough processing, there is still a conspicuous deterioration in the processing quality.

The present invention was conceived in view of the above described circumstances, and it is an object thereof to provide a roughing end mill and an insert which make it possible to form a high quality processing surface while achieving a sufficient reduction in resistance and improvement in chip processability.

Means for Solving the Problem

The roughing end mill of the present invention includes: an end mill body which is rotated around an axis; and a plurality of inserts which are placed on an outer circumference of the end mill body a predetermined distance apart from each other in the direction of the axis, wherein the plurality of inserts form insert rows of which a plurality are provided in a circumferential direction of the end mill body, and at least the inserts included in a group are positioned so as to be offset in the axial direction from each other in the different insert rows which are mutually adjacent in the circumferential direction, and the inserts included in the group are provided with cutting edges which face towards an outer circumferential side of the end mill body and which are formed as waveform cutting edges which undulate as they move in the axial direction, and one insert of one insert row of the inserts included in the group and an insert of another insert row which is offset therefrom in the axial direction among the inserts included in the group are positioned such that the waveform cutting edges of each of these inserts make up a waveform cutting edge row whose phase is continuous on a rotation trajectory around the axis, and a plurality of these waveform cutting edge rows which have mutually different phases are formed on the outer circumference of the end mill body.

In a roughing end mill which is formed in this manner, firstly, because at least the inserts included in the group which make up a plurality of insert rows are positioned so as to be offset in the axial direction from each other in different insert rows which are mutually adjacent in the circumferential direction, and because the cutting edges which face towards an outer circumferential side of the end mill body are formed as waveform cutting edges which undulate as they move in the axial direction of the end mill body, in portions where the inserts included in the group are placed, chips can be cut into fragments by the cutting edges of each of the inserts which are separated from each other in the axial direction of each insert row, and the chips themselves which are created in this manner are created by being cut into fragments by waveform cutting edges which results in it being possible to achieve a reduction in cutting resistance and an improvement in chip processability.

Furthermore, in the inserts included in the group, because one insert of one insert row and an insert of another insert row which are offset in the axial direction are positioned so as to form a waveform cutting edge row in which the phases of the waveform cutting edges are continuous on a rotation trajectory around the axis, and because a plurality of these waveform cutting edge rows are formed on an outer circumference of the end mill body such that the phases thereof are different from each other, it is possible to cut a smooth processing surface by using the raised portions of another waveform cutting edge row to cut the raised portions of an opposite-phase waveform cross section which have been formed on a processing surface of a work piece by the one waveform cutting edge row. Accordingly, in spite of the processing being only coarse processing, it is possible to perform comparatively smooth, high quality cutting of a processing surface.

Moreover, in the present invention, by positioning the one insert such that it forms the waveform cutting edge row together with at least one insert from the other insert row which is adjacent in the circumferential direction to the one insert row, immediately after the cutting of the work piece by the waveform cutting edge of this one insert, the work piece is cut by the waveform cutting edge of the one insert which forms the waveform cutting edge row which is continuous with this one insert. Because of this, it is possible to prevent the opposite-phase waveform cross section processing surface which is formed in the work piece by this waveform cutting edge row being shifted a considerable distance in the feed direction as a result of the feeding of the end mill body and becoming discontinuous, and an even smoother high-quality processing surface can be obtained.

Furthermore, in the present invention, by making the inserts included in the group which make up the above described plurality of waveform cutting edge rows have the same shape and size as each other, it is possible to simplify the control and handling thereof. In this case, it is possible to position all of the inserts included in the group in the one insert row at spacings in the axial direction which are integral multiples of the wavelength of the waveform cutting edges thereof, and thus position them such that they form a common waveform cutting edge row. However, by placing an insert which makes up a different waveform cutting edge row from that of the other inserts in at least one insert row, and positioning this insert at a different sized gap in the axial direction from the other inserts, while this insert makes up a waveform cutting edge insert row together with inserts from another insert row, the other inserts from this same insert row are placed so as to make up the aforementioned common waveform cutting edge insert row which is different from this.

Moreover, the insert of the present invention is an insert which is placed in the above described roughing end mill as the insert included in the group, wherein the cutting edges are formed on an intersecting ridge line portion between a rake face which faces in the rotation direction of the end mill body and a flank face which intersects with this rake face and faces towards the outer circumferential side of the end mill body, and the cutting edges are formed into waveform cutting edges as a result of a plurality of groove portions and raised portions being formed alternatingly along the cutting edges on the rake faces and extending as far as the flank faces thereof, and at least one of the groove portions is formed as a deep groove portion which has a deeper groove depth than the other groove portions.

Accordingly, in these inserts, the waveform cutting edges undulate in the circumferential direction of the end mill body as they move in the axial direction of the end mill body, namely, the raised portions form protrusions in the rotation direction of the end mill body and the groove portions form recesses on the rearward side in this rotation direction. As a result, the waveform cutting edges are able to gradually bite into a work piece starting from the raised portions thereof, and the impact during this biting can be alleviated. Furthermore, because at least one of the groove portions is formed as a deep groove portion which has a deeper groove depth than the other groove portions, even in an up-cut in which, for example, a work piece is cut such that the thickness of the chips becomes thicker from a thin portion, it is possible to reliably cut these chips into fragments by means of the deep groove portions which have a deeper groove depth. Meanwhile, because the other groove portions have a shallower groove depth than the deep groove portions, it is possible to prevent the strength of the inserts being diminished.

Advantageous Effects of the Invention

In this manner, according to the roughing end mill of the present invention, by forming a plurality of waveform end blade rows having different phases on the outer circumference of the end mill body thereof, it is possible to reliably cut chips into minute fragments and sufficiently reduce cutting resistance, and to also improve chip processability. At the same time, it is possible to cut the processing surface of a work piece more smoothly, and obtain a high quality processing surface in spite of the processing being only coarse processing. Moreover, as a result of the inserts of the present invention being fitted onto this type of roughing end mill, it is possible to alleviate the impact when the waveform cutting edges bite into a work piece, and to more reliably cut chips into minute fragments while guaranteeing the insert strength.

In addition, it is possible to more effectively achieve a reduction in cutting resistance and an improvement in chip processability.

DESCRIPTION OF THE REFERENCE SYMBOLS

1 . . . End mill body,
2 . . . Chip removal groove,
3 . . . Insert mounting seat,
11A~11C . . . Insert bodies,
12 . . . Rake face,
14 . . . Flank face,
15, 15A, 15B . . . Cutting edges (waveform cutting edges),
18 . . . Groove portion,
18A . . . Shallow groove portion,
18B . . . Deep groove portion,
19 . . . Raised portion,
20 . . . Corner portion,
A~C . . . Inserts,
O . . . Rotation axis of end mill body 1,
T . . . Rotation direction of end mill body 1,
S1~S4 . . . Insert rows

BEST MODE FOR CARRYING OUT THE INVENTION

Figure 1:
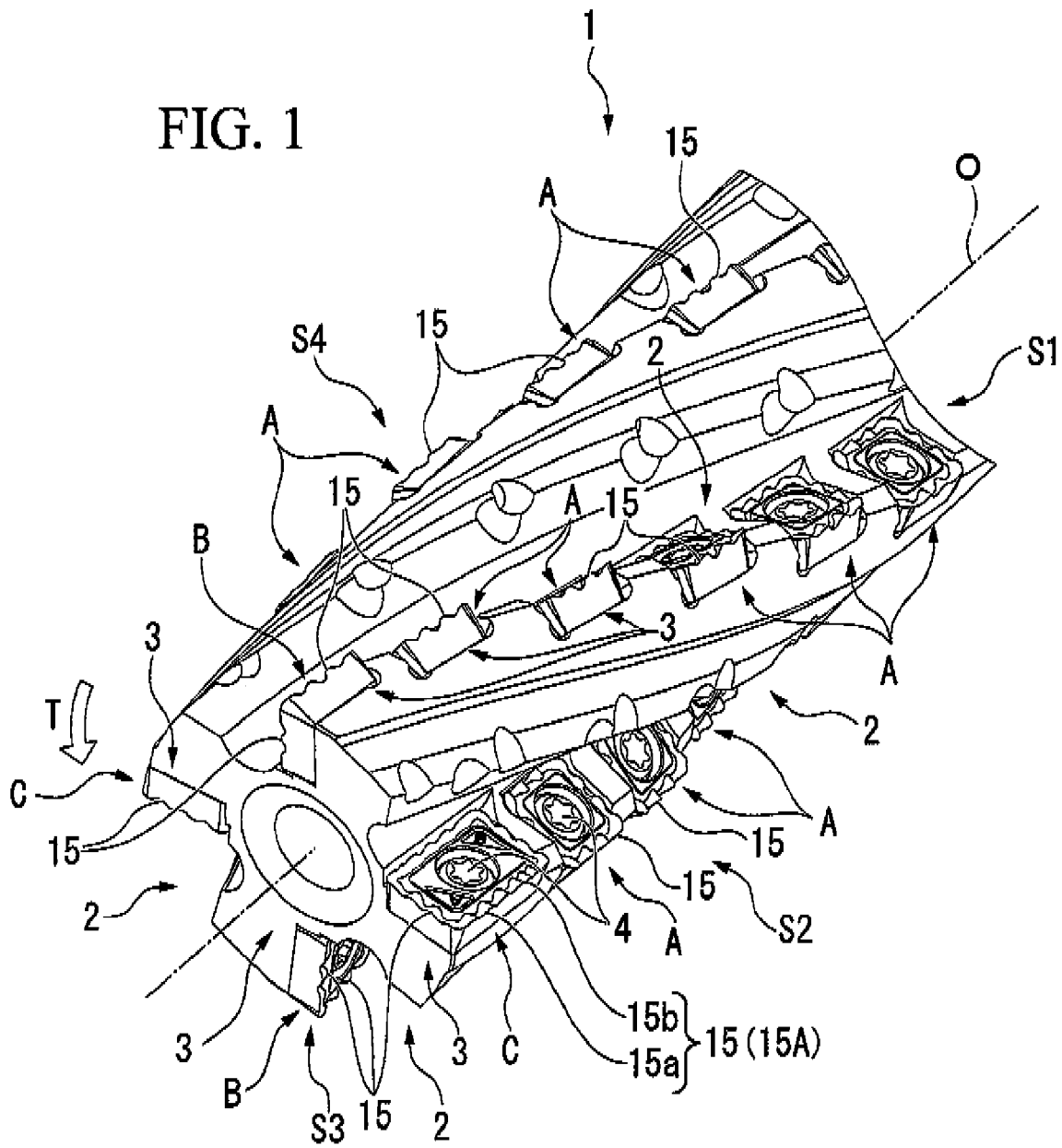
FIG. 1 is a perspective view showing a roughing end mill according to an embodiment of the present invention.
Figure 2:
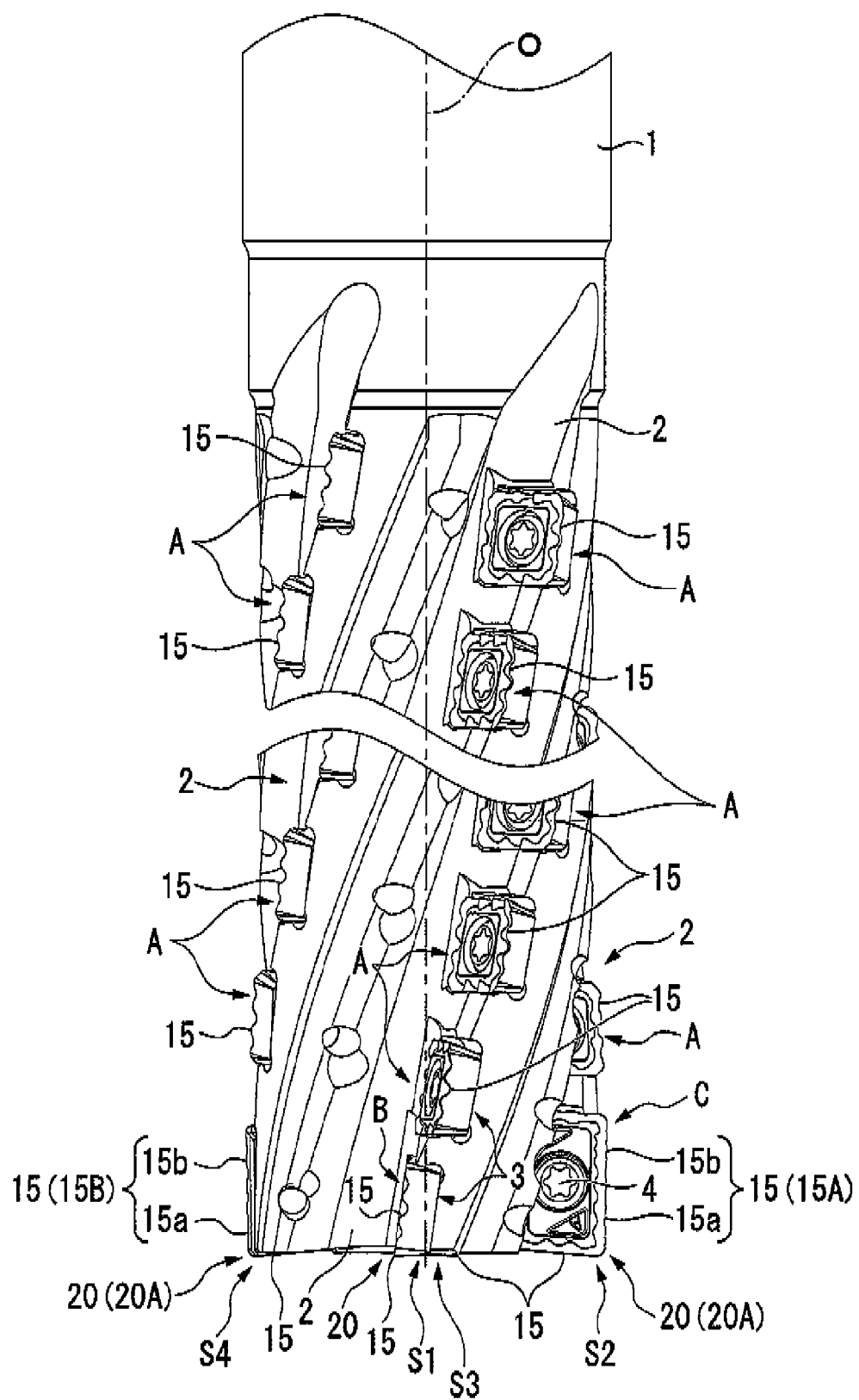
FIG. 2 is a side view of the embodiment shown in FIG. 1.
Figure 3:
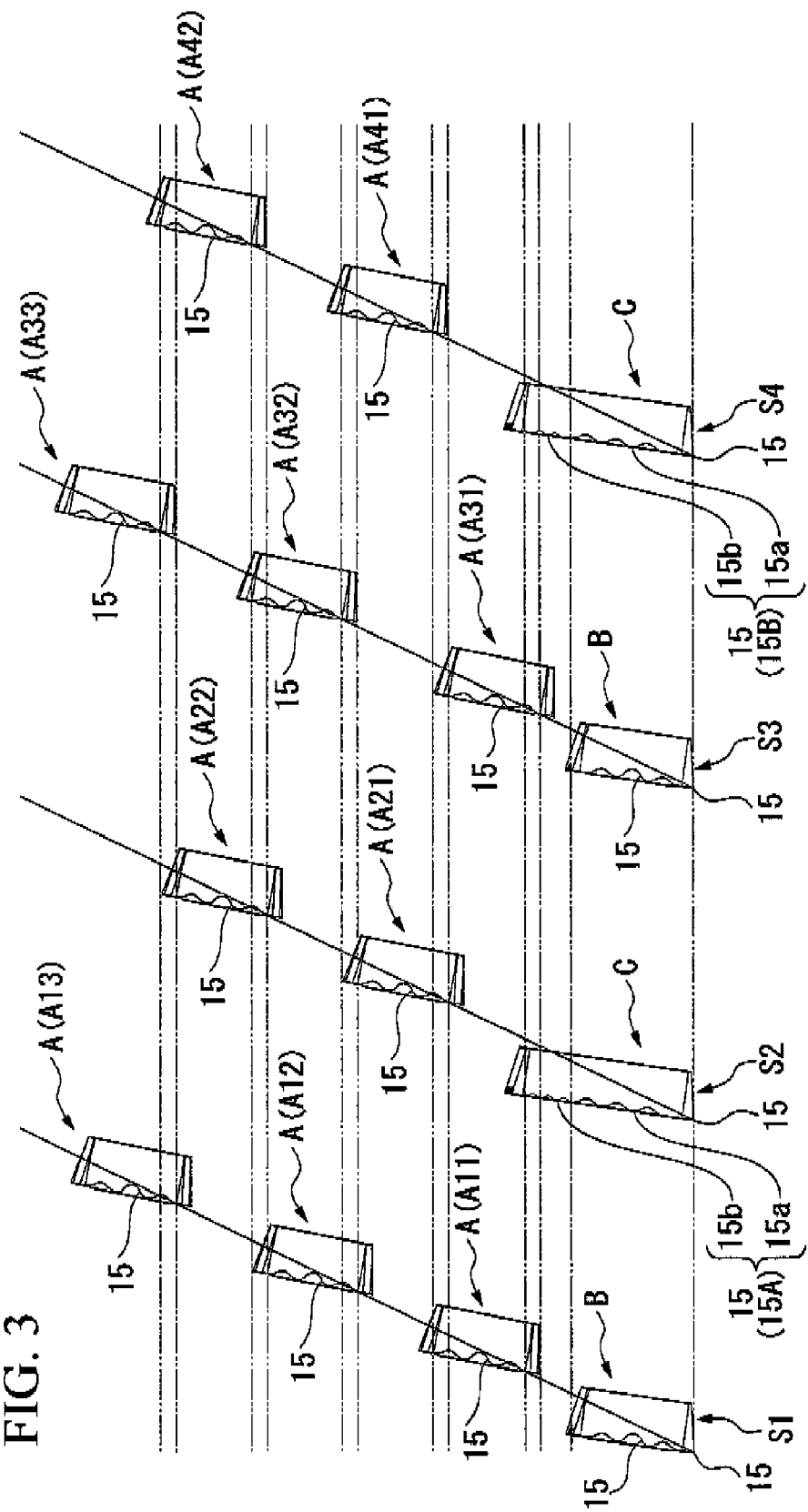
FIG. 3 is an expanded view illustrating a placement of inserts A to C of the embodiment shown in FIG. 1.
Figure 4:
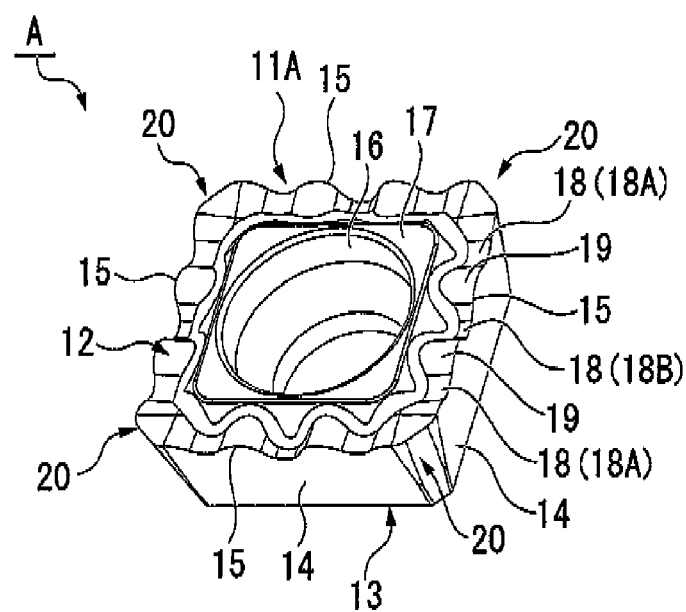
FIG. 4 is a perspective view of the insert A of an embodiment of the present invention which is placed in the roughing end mill of the embodiment shown in FIG. 1.
Figure 5:
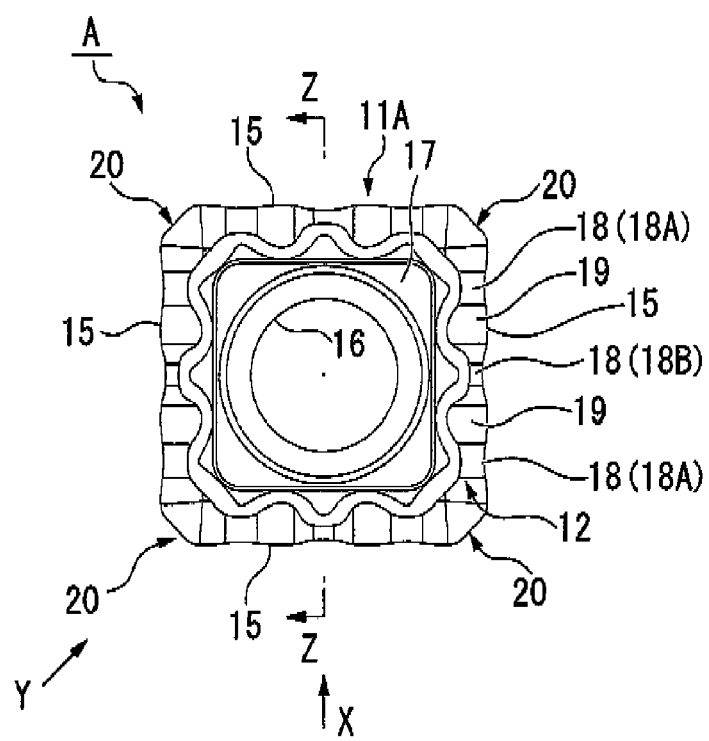
FIG. 5 is a plan view of the insert A shown in FIG. 4.
Figure 6:
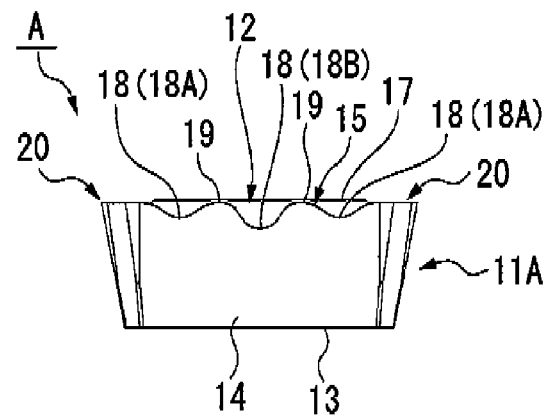
FIG. 6 is a side view as seen from the direction of an arrow X in FIG. 5.
Figure 7:
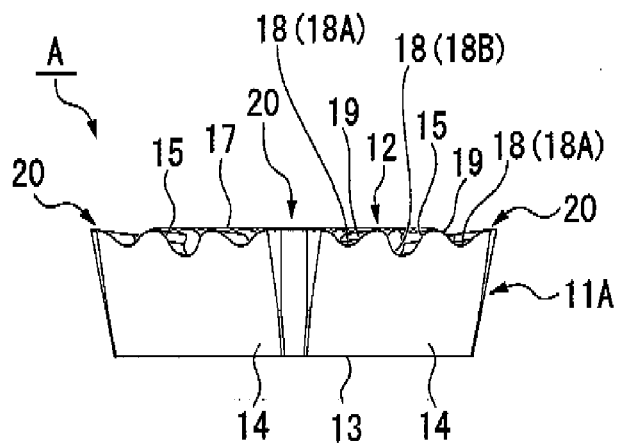
FIG. 7 is a side view as seen from the direction of an arrow Y in FIG. 5.
Figure 8:
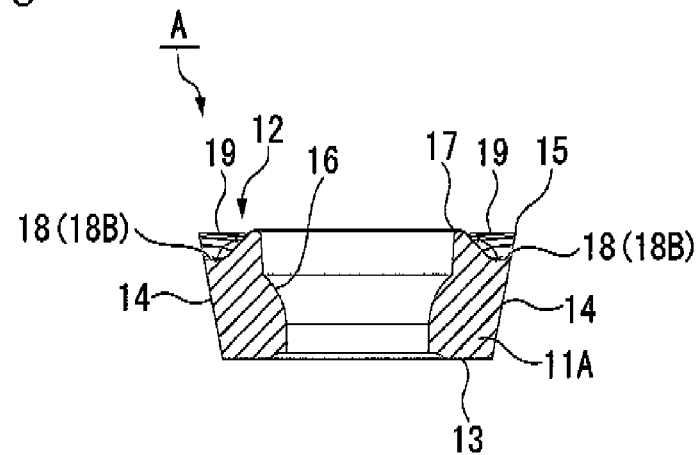
FIG. 8 is a cross-sectional view taken along a line Z-Z in FIG. 5.
Figure 9:
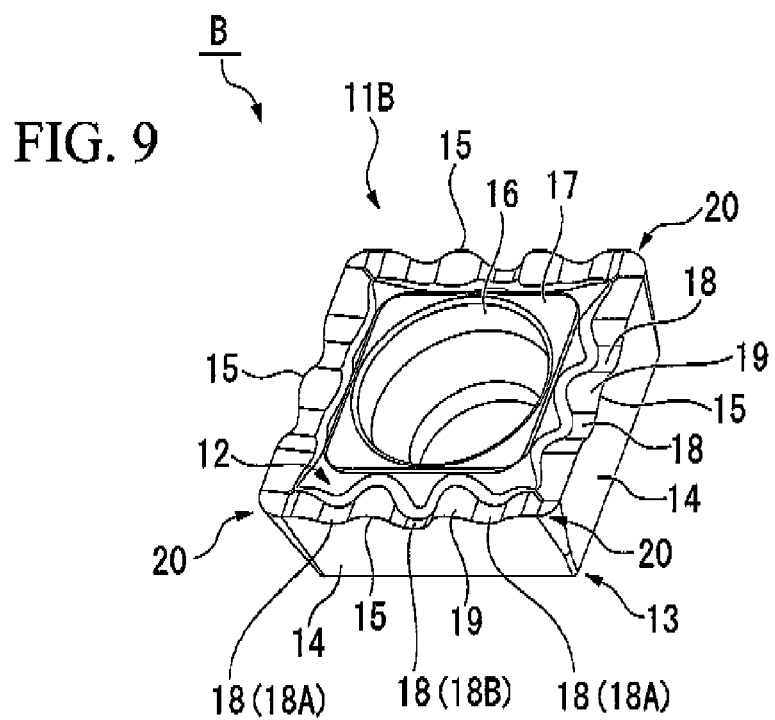
FIG. 9 is a perspective view of the insert A which is placed in the roughing end mill of the embodiment shown in FIG. 1.

FIG. 1 through FIG. 3 show a roughing end mill of an embodiment of the present invention. FIG. 4 through FIG. 8 each show an insert A of an embodiment of the present invention which is placed in this roughing end mill so as to form at least a group of the aforementioned inserts. FIG. 9 through FIG. 13 and FIG. 14 through FIG. 19 respectively show other inserts B and C which are placed in the roughing end mill of the above embodiment. Namely, in the roughing end mill of the present embodiment, the inserts included in the group form the inserts A of the above embodiment, while the remaining inserts form the other inserts B and C.

The roughing end mill of the present embodiment has an end mill body 1 which is formed from steel or the like with a substantially circular column-shaped outer configuration centered on an axis O. A plurality of (four in the present embodiment) spiral-shaped chip removal grooves 2 are formed equidistantly in the circumferential direction on an outer circumference of a distal end portion of the end mill body 1. These chip removal grooves 2 are twisted around the axis O moving from the distal end of the end mill body 1 towards the rear end side in the direction of the axis O (i.e., in an upwards direction in FIG. 2) towards the rear in a rotation direction T in which the end mill body 1 rotates during a cutting process. A plurality of insert mounting seats 3 which are placed apart from each other in the direction of the axis O are formed in a wall surface of each chip removal groove 2 which faces in the aforementioned rotation direction T. The aforementioned inserts A through C are removably mounted by means of clamping screws 4 in these insert mounting seats 3.

These inserts A through C are provided with square plate-shaped insert bodies 11A, 11B, and 11C which are formed from a hard material such as cemented carbide. One of two square surfaces which face in the thickness direction of the flat plate formed by each of the insert bodies 11A, 11B, and 11C is formed as a rake face 12, while the other surface is a flat surface which is perpendicular to the aforementioned thickness direction and serves as a seating surface 13 for mounting on an insert mounting seat 3. Four circumferential surfaces which are placed around the periphery of the square surfaces each form flank faces 14. Cutting edges 15 are formed in intersecting ridge portions between the four flank faces 14 and the aforementioned rake face 12. Here, each flank face 14 is formed as a positive flank face which gradually recedes as it moves from the rake face 12 towards the seating surface 13 side. The inserts A through C are thus formed as positive inserts which have a relief angle formed in the cutting edges 15.

Moreover, a mounting hole 16 through which the aforementioned clamping screw 4 is inserted is formed extending in the thickness direction from the center of the rake face 12 to the seating surface 13. In addition, the periphery of the aperture portion of the mounting hole 16 in the rake face 12 is formed as a boss surface 17 which is a flat surface which is perpendicular to the thickness direction and which protrudes in the thickness direction beyond the cutting edges 15. The boss surface 17 has substantially the same outer configuration as the rake face 12 of each of the inserts A through C, but is formed at a smaller size than the rake face 12. A plurality of groove portions 18 and raised portions 19 which reach as far as the flank faces 14 are formed alternatingly along the cutting edges 15 in the rake face 12 on the outer side of the boss surface 17. As a result of these groove portions 18 and raised portions 19 being formed so as to intersect with the flank faces 14, the cutting edges 15 are formed as waveform cutting edges which undulate in the thickness direction and extend in a circumferential direction around the rake face 12. Moreover, because the flank faces 14 are formed as positive flank faces, the cutting edges 15 are formed as waveform cutting edges which also undulate inwards and outwards relative to the rake face 12 when seen in plan view facing the rake face 12 along the aforementioned center line.

Here, the cutting edges 15 at each corner portion 20 of the square rake faces 12 of the respective inserts A through C are formed so as to extend along a single plane which is perpendicular to the thickness direction. The waveform cutting edges are formed by alternating the groove portions 18 and the raised portions 19 in this order starting from these corner portions 20, and the apex point of each raised portion 19 is located on the level of the aforementioned single plane. Moreover, in the present embodiment, apart from a portion thereof, the waveform cutting edges formed by these groove portions 18 and raised portions 19 have a broadly circular arc shape made up of smoothly continuous concave curves and convex curves. Note that the groove portions 18, the raised portions 19, and the corner portions 20 are inclined where their cross sections intersect with the flank face 14 so as to slope slightly downwards in the thickness direction as they move away from the cutting edges 15 towards the inner side of the rake face 12. Moreover, on the inner side of the rake face 12, a wall surface around the boss surface 17 which intersects with the groove portions 18, raised portions 19, and corner portions 20 is formed as a sloping surface which rises upwards in the thickness direction at a steeper gradient than the slope of the groove portions 18, raised portions 19, and corner portions 20 as it moves inwards until it reaches the boss surface 17.

Of the inserts A through C, the insert A of the above described embodiment has a substantially square, planar shape and is formed so as to be rotationally symmetrical every 90° around the center line of the mounting hole 16. The cutting edges 15 of the insert A are made up of three groove portions 18 and two raised portions 19 being placed alternatingly between adjacent corner portions 20. As a result, the cutting edges 15 present a waveform shape having a uniform wavelength and, particularly in the present embodiment, the intervals between the bottommost portions of the groove portions 18 and the topmost portions of the raised portions 19 are mutually equivalent. Furthermore, of these, the groove depth in the thickness direction of the groove portions 18 on the two corner portion 20 sides are mutually equivalent, and form shallow groove portions 18A which have a shallow groove depth, while the groove portion 18 in the center forms a deep groove portion 18B whose groove depth is deeper than that of the shallow groove portions 18A. Namely, the shallow groove portions 18A and the deep groove portion 18B are formed alternatingly, and have different wave amplitudes. Note that the cutting edges 15 of this insert A form chamfered corner blades in the corner portions 20 where the corners of the aforementioned square have been rectilinearly chamfered when seen in plan view.

Figure 10:
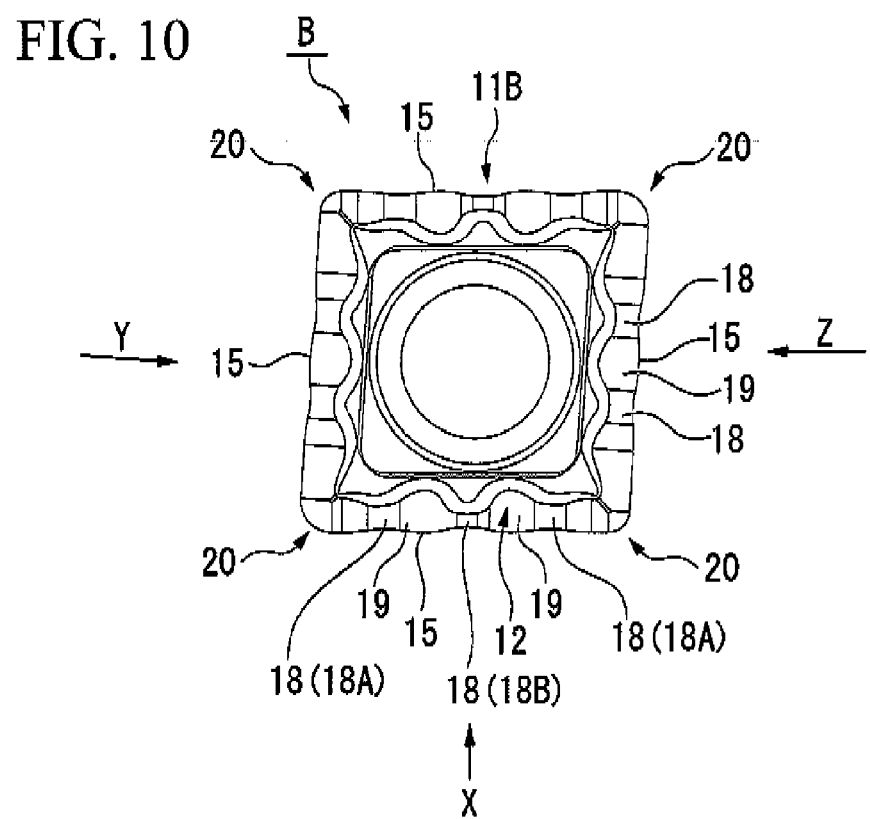
FIG. 10 is a plan view of the insert B shown in FIG. 9.
Figure 11:
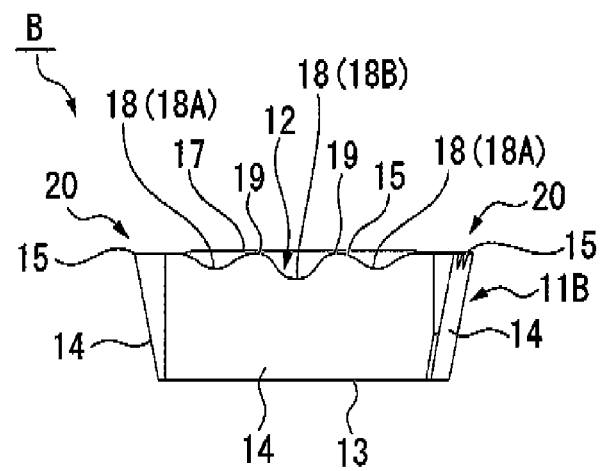
FIG. 11 is a side view as seen from the direction of an arrow X in FIG. 10.
Figure 12:
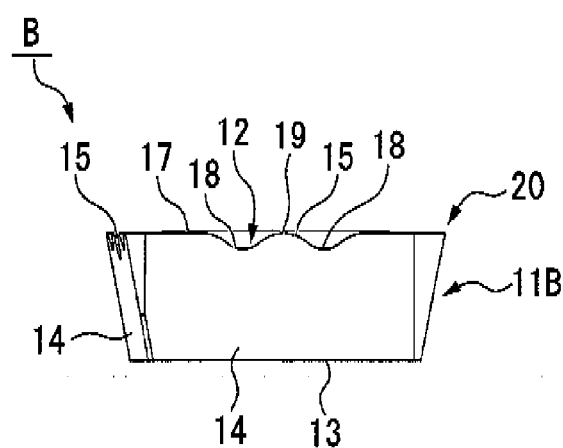
FIG. 12 is a side view as seen from the direction of an arrow Y in FIG. 10.
Figure 13:
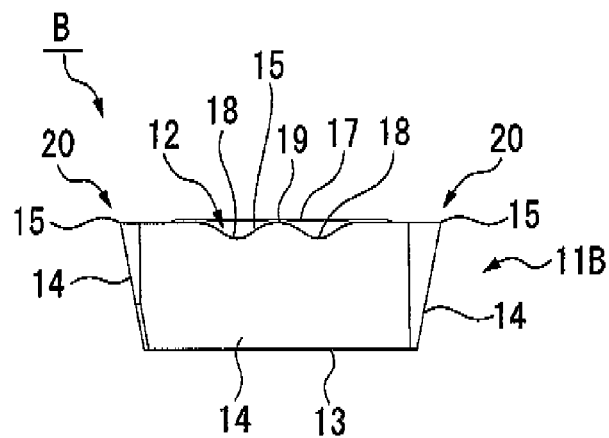
FIG. 13 is a side view as seen from the direction of an arrow Z in FIG. 10.
Figure 14:
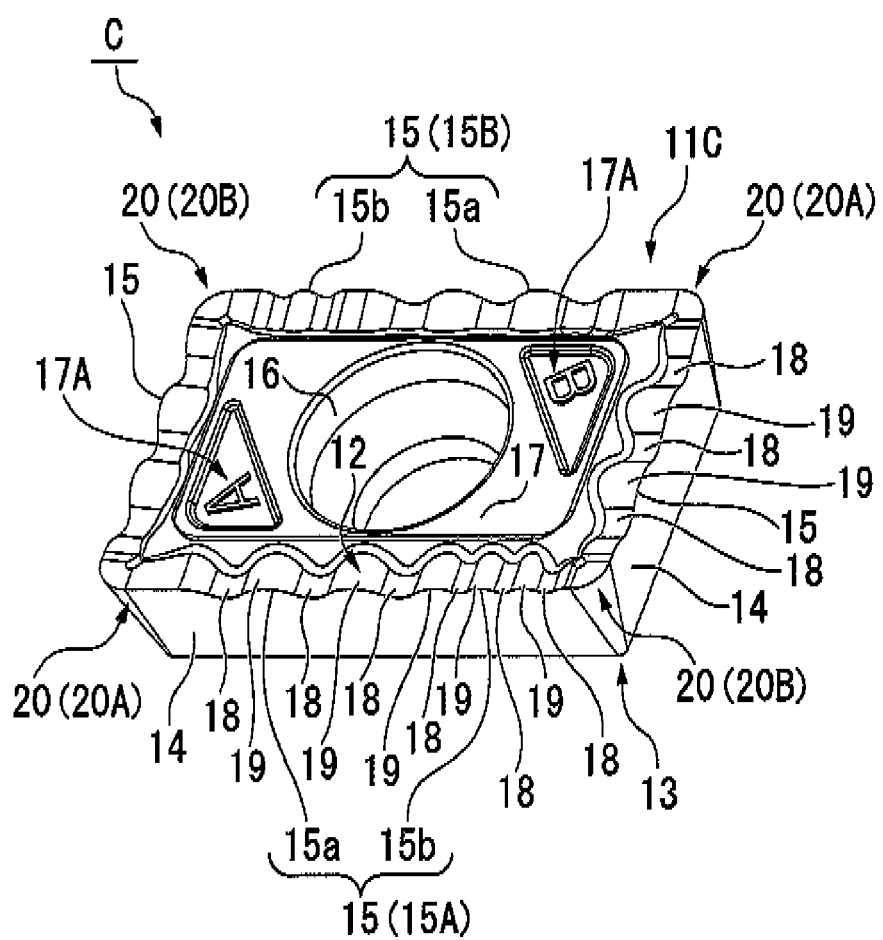
FIG. 14 is a perspective view of the insert C which is placed in the roughing end mill of the embodiment shown in FIG. 1.
Figure 15:
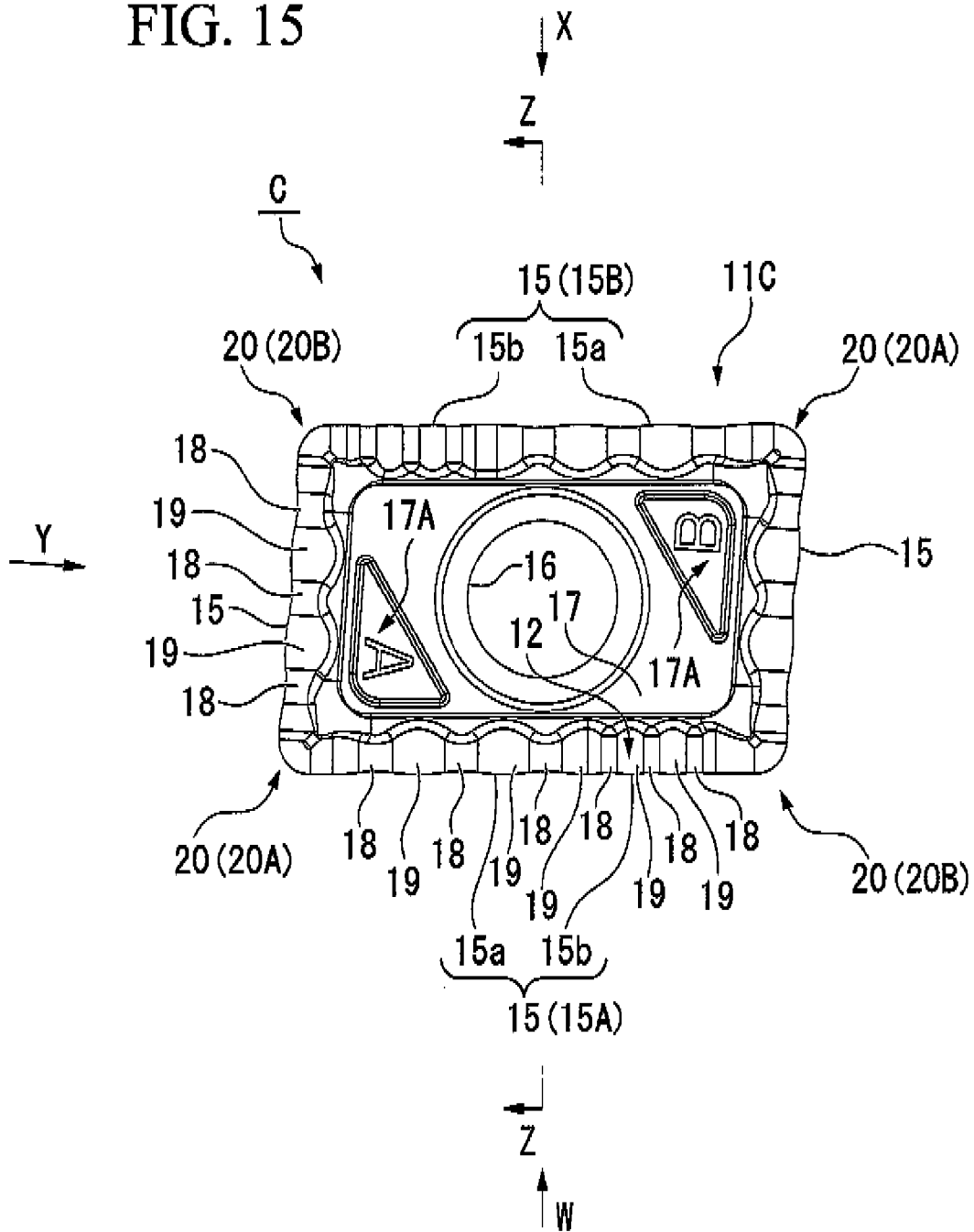
FIG. 15 is a plan view of the insert C shown in FIG. 14.

In contrast, as is shown in FIG. 10 and FIG. 15, the other inserts B and C are formed as substantially rhomboid flat plates in which the respective corner portions 20 of the rake face 12 are either slightly acute angles or slightly obtuse angles. However, while the long sides of the parallelogram (i.e., the sides extending in a vertical direction in FIG. 10) are slightly longer than the short sides (i.e., the sides extending in a horizontal direction in FIG. 10) in the inserts B, in the inserts C the length of the short sides is the same as in the inserts B while, as is shown in FIG. 15, the long sides are longer than those in the inserts B. Note that the gaps between the long sides in the inserts B and C are the same as each other, and the gaps between opposing sides in the inserts A are also the same. Furthermore, the respective corner angles in the acute angle corner portions 20A and the obtuse angle corner portions 20B of the corner portions 20 are the same as each other in the inserts B and C. Accordingly, the inserts C have an external shape which is obtained by extending the inserts B in the direction of the long sides thereof.

Of these, the inserts B are formed so as to be rotationally symmetrical every 180° around the center line of the mounting hole 16 (i.e., so as to have line symmetry). In the same way as in the inserts A, three groove portions 18 and two raised portions 19 are formed alternatingly between adjacent corner portions 20 so that waveform cutting edges 15 having a uniform wavelength are formed. Furthermore, the groove portions 18 on the two corner portion 20 sides form shallow groove portions 18A, while the groove portion 18 in the center forms a deep groove portion 18B. In contrast, as a result of two groove portions 18 and one raised portion 19 being formed alternatingly on the short sides at a distance from the adjacent corner portions 20, waveform cutting edges 15 having a uniform wavelength are formed and the groove depths of these groove portions 18 are the same as each other. Namely, the amplitude of the waveform formed by the cutting edges 15 on these short sides is also uniform. Note that the cutting edges 15 in the corner portions 20 of the inserts B and the inserts C form R corner blades in which the corner portions 20 are chamfered as protruding circular arcs when seen in plan view.

In contrast to this, in the inserts C, the cutting edges 15 formed on the short sides of the inserts B which are provided with three groove portions 18 alternating with two raised portions 19, and the waveform cutting edges 15 having the same wavelength and amplitude are formed on the short sides thereof. However, the groove portions 18 on both ends are formed adjacent to the two corner portions 20, so that the phases of the waveforms formed by the cutting edges 15 when the short sides of the inserts B and C are overlapped with each other are mutually offset by half a wavelength. Note that the groove portions 18, raised portions 19, and cutting edges 15 which are formed on the pair of short sides of this insert C are rotationally symmetrical in a 180° rotation around the center line of the mounting hole 16.

In contrast, six groove portions 18 and five raised portions 19 are formed alternately on the long sides of the inserts C so as to form waveform cutting edges 15, however, the waveforms formed by the cutting edges 15 on these long sides are mutually different in portions. Specifically, in the inserts C, the wavelength and amplitude differ bordering on the apex portion of the center raised portion 19. Namely, of the cutting edges 15 formed on these long sides, in an acute angle corner cutting edge portion 15a which is located between the apex portion of the center raised portion 19 and the acute angle corner portions 20A, compared with an obtuse angle corner cutting edge portion 15b which is located between this apex portion and the obtuse angle corner portions 20B, the groove depth of the groove portions 18 is deeper and the width of the groove portions 18 and raised portions 19 is also greater. As a result, in the cutting edges 15 of each three wave portion formed between these, the acute angle corner cutting edge portions 15a have a larger wavelength and amplitude than the obtuse angle corner cutting edge portions 15b, and in this insert C each one is twice as large.

Accordingly, in conjunction with this, the acute angle corner cutting edge portions 15a occupy a greater length of the cutting edges 15 formed on the long sides than do the obtuse angle corner cutting edge portions 15b, and the length from the distal end of the acute angle corner portion 20A of the acute angle corner cutting edge portion 15a to the apex portion of the center raised portion 19 is equal to the length from the distal end of the acute angle corner portion 20A to the boundary thereof with the obtuse angle corner portion 20B of the cutting edge 15 formed on the long side of the above described inserts B. Note that in both the acute angle corner cutting edge portions 15a and the obtuse angle corner cutting edge portions 15b, the depths of the groove portions 18 are the same, and the amplitude of the waveforms formed by these cutting edges 15 as well as the wavelength thereof are uniform.

Furthermore, in this insert C, when the insert C is rotated 180° around the center line of the mounting hole 16, the phases of the waveforms of at least a portion of the cutting edges 15 formed on the long sides are different between the pair of long sides of the parallelogram formed by the rake face. Specifically, in this insert C, when the insert C is rotated 180° as is described above, of the cutting edges 15 formed on each one of the pair of long sides, the phases of the waveforms of the pair of acute angle corner cutting edge portions 15a are formed so as to match each other, while the phases are different for the obtuse angle corner cutting edge portions 15b. In particular, the phases thereof are offset by half the wavelength of the waveform of the cutting edges 15 in the obtuse angle corner cutting edge portions 15b.

Figure 16:
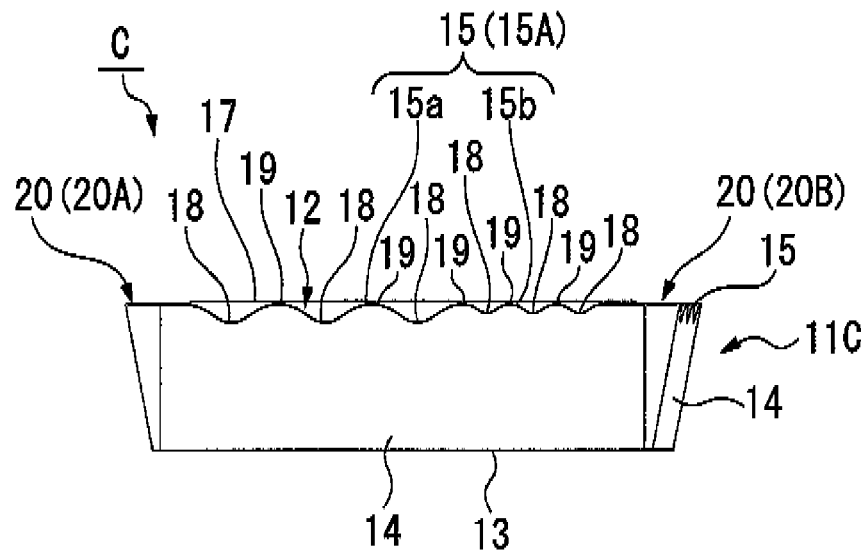
FIG. 16 is a side view as seen from the direction of an arrow W in FIG. 15.

Here, in the above described insert C, in order to offset the phases of the obtuse angle corner cutting edge portions 15b in this manner, in the cutting edge 15A formed on the one long side shown at the bottom in FIG. 15 and in FIG. 16, the groove portions 18 of the obtuse angle corner cutting edge portions 15b are formed so as to be continuous with the apex portion of the center raised portion 19 of this cutting edge 15A, and a space is opened up between the groove portion 18 on the obtuse angle corner portion 20B side of this obtuse angle corner cutting edge portion 15b and this obtuse angle corner portion 20B, and a short rectilinear portion is formed extending from the obtuse angle corner portion 20B along the aforementioned single plane.

Figure 17:
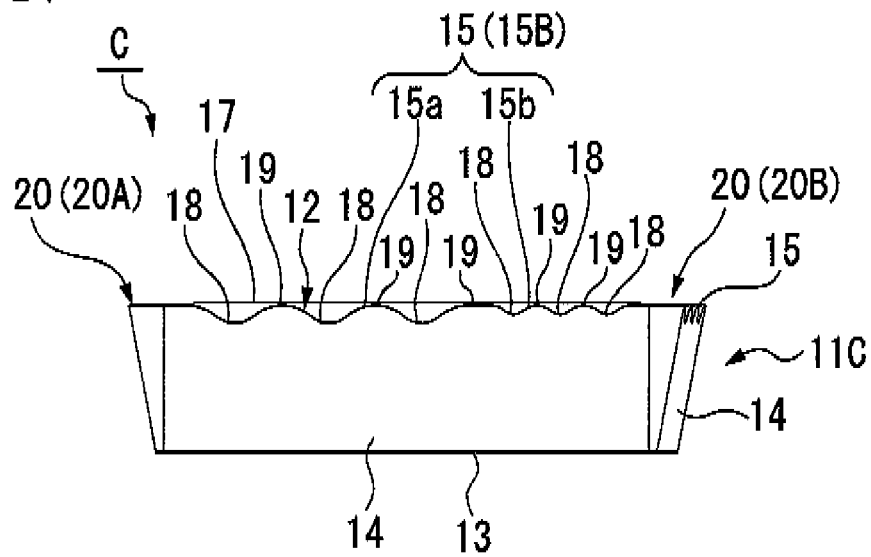
FIG. 17 is a side view as seen from the direction of an arrow X in FIG. 15.
Figure 18:
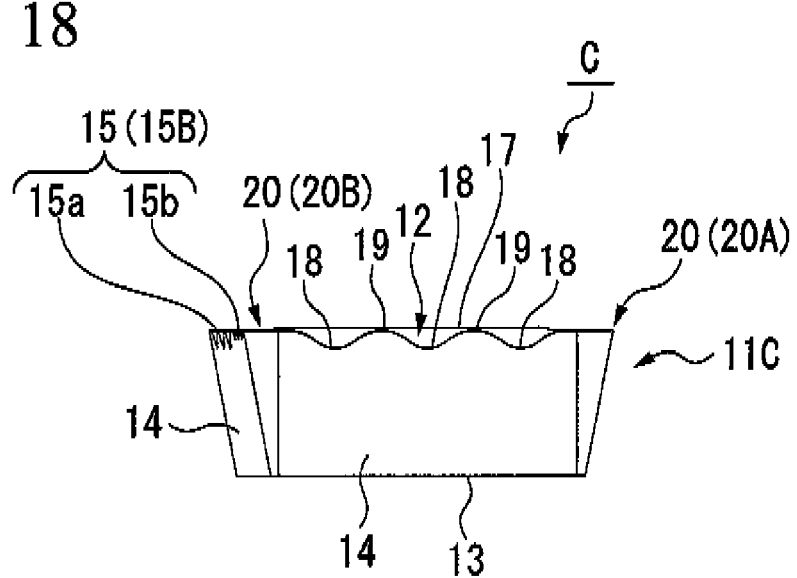
FIG. 18 is a side view as seen from the direction of an arrow Y in FIG. 15.
Figure 19:
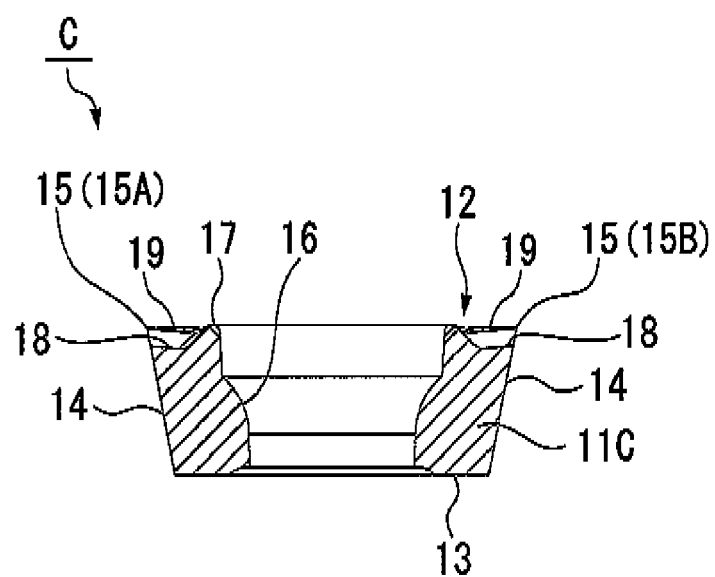
FIG. 19 is a cross-sectional view taken along a line Z-Z in FIG. 15.

In contrast, in the cutting edge 15B formed on the other long side shown at the top in FIG. 15 and in FIG. 17, conversely, the groove portions 18 of the obtuse angle corner cutting edge portions 15b are formed so as to be continuous on the obtuse angle corner portion 20B side of this cutting edge 15B with this obtuse angle corner portion 20B, and a short rectilinear portion is formed on the apex portion of the center raised portion 19 of the cutting edge 15B extending along the aforementioned single plane, and the groove portion 18 on the obtuse angle corner cutting edge portion 15b side of this center raised portion 19 is formed with a gap between itself and the acute angle corner cutting edge portion 15a. Note that different characters 17A such as, for example, [A] and [B] are provided respectively inside recessed locations formed in inside portions of the pair of acute angle corner portions 20A in the boss surface 17 of this insert C so as to correspond to the providing of the waveform cutting edges 15A and 15B which have different phases in certain portions.

As is shown in FIG. 3, these inserts A through C are arranged such that two each of the inserts B and C are mounted alternatingly in the circumferential direction in four insert mounting seats 3 which are formed at the tip of the distal end of the respective chip removal grooves 2 of the end mill body 1, and such that inserts A are mounted in the remaining insert mounting seats 3 thereby forming an insert row in each of the chip removal grooves 2. Accordingly, in the present embodiment, two insert rows of the inserts B and A and two insert rows of the inserts C and A respectively in that sequence from the distal end side are arranged alternatingly in the circumferential direction. Note that a plurality of the inserts A are provided in each of these insert rows.

Of these, the insert mounting seats 3 at the tip of the distal end where the inserts B and C are mounted are formed as recessed portions which are open to the distal end surface and outer circumferential surface of the end mill body 1 by sufficiently hollowing out the wall surface of the chip removal groove 2 which faces in the aforementioned rotation direction T. The insert mounting seats 3 are provided with a bottom surface which faces in the rotation direction T, and with a wall surface which faces towards the distal end side of the end mill body 1 and a wall surface which faces towards the outer circumferential side of the end mill body 1. The inserts B and C are then fastened in this type of insert mounting seat 3 with the rake faces 12 thereof facing in the aforementioned rotation direction T and the seating surface 13 thereof being adhered to the aforementioned bottom surface, and with one acute angle corner portion 20A being positioned at the outer circumferential side of the distal end of the end mill body 1, and the cutting edge 15 which is formed on the above described long side which intersects this acute angle corner portion 20A protruding as an outer circumferential blade on the outer circumferential side of the end mill body 1 and the cutting edge 15 on the above described short side protruding as a bottom blade towards the distal end side of the end mill body 1. The pair of flank faces 14 which intersect the acute angle corner portion 20A on the opposite side from this are then seated by being butted against the aforementioned wall surface, and the clamp screw 4 which is inserted through the mounting hole 16 is then screwed into a threaded hole formed in the bottom surface thereby completing the fastening.

The inserts B and C which are mounted in this manner are positioned such that the positions in the O axial direction of the acute angle corner portions 20A thereof which are facing towards the outer circumferential side at the distal end of the end mill body 1, as well as the radius from the axis O of each one are equal to each other, and such that the cutting edges 15 extend roughly in parallel with the axis O as seen from the rotation direction T side. Accordingly, the rotation trajectory of these cutting edges 15 around this axis O forms a substantially circular cylinder shape centered on the axis O with the cutting edges 15 of the inserts B overlapping with the acute angle corner cutting edge portions 15a of the cutting edges 15 of the inserts C. Moreover, the cutting edges 15 which form the bottom blades facing towards the distal end side are slightly tilted at the same angle as each other in the inserts B and C so as to move towards the rear end side of the end mill body 1 as they move towards the inner circumferential side, and the rotation trajectories thereof around the axis O also overlap with each other.

In contrast, the insert mounting seats 3 where the inserts A of the present embodiment are mounted are formed as recessed portions which are open to the outer circumferential surface of the end mill body 1 by sufficiently hollowing out the aforementioned wall surface of the chip removal groove 2. The insert mounting seats 3 are provided with a bottom surface which faces in the rotation direction T, and with three wall surfaces, namely, a wall surface which faces towards the distal end side of the end mill body 1, a wall surface which faces towards the outer circumferential side, and a wall surface which faces towards the rear end side of the end mill body 1. The inserts A are then fastened in this type of insert mounting seat 3 by the clamp screws 4 in the same way as the inserts B and C with the rake faces 12 thereof facing in the aforementioned rotation direction T, and the seating surfaces 13 thereof being adhered to the aforementioned bottom surfaces, and with one cutting edge 15 protruding on the outer circumferential side as an outer circumferential blade, and with the flank faces 14 which are continuous with the remaining three cutting edges 15 then seated by being butted against the respective wall surfaces.

The inserts A which are mounted in this manner are positioned such that the one cutting edge 15 thereof which forms the outer circumferential blade extends roughly in parallel with the axis O as seen from the rotation direction T side, and such that the rotation trajectory thereof around this axis O forms a substantially circular cylinder shape centered on the axis O, with the radius thereof being equal to that of the rotation trajectories of the cutting edges 15 which form the outer circumferential blades of the inserts B and C. Note that, as is shown in FIG. 3, in the O axial direction, as they move towards the rear the rake faces 12 of these inserts A through C are inclined at a smaller angle than the twist angle of the chip removal grooves 2 towards the rear in the rotation direction T, while in the radial direction of the end mill body 1, they are inclined towards the rotation direction T side as they move towards the inner circumferential side. In addition, a positive axial rake angle and a negative radial rake angle are imparted to the cutting edges 15 which form the outer circumferential blades of the inserts A through C and to the cutting edges 15 which form the bottom blades of the inserts B and C. Naturally, a relief angle is imparted to the flank face 14 of each cutting edge 5 in order to avoid interference between these blades and the working surface.

In addition, of these inserts A through C, the inserts A which form inserts included in a group of the present embodiment, as is described above, are placed such that, as is shown in FIG. 3, insert rows which are adjacent to each other in the circumferential direction are offset from each other in the O axial direction. Furthermore, one insert A of one insert row and an insert A of another insert row which is offset therefrom in the O axial direction are positioned such that the waveforms of the waveform cutting edges which are formed by the cutting edges 15 which form the outer circumferential blades of these inserts have phases which are continuous in a rotation trajectory around the axis O. One waveform cutting edge row is formed by the waveform cutting edges 15 whose waveforms are continuous in this manner, and a plurality of these waveform cutting edge rows having different phases are formed on the outer circumference of the end mill body 1.

Specifically, in the present embodiment, as is shown in FIG. 3, the inserts A excluding the inserts B and C at the tip of the distal end are positioned such that in each insert row a gap of less than one insert A is formed in the O axial direction, and in insert rows which are adjacent to each other in the circumferential direction, the inserts A of one of these adjacent inserts rows are positioned in the gap portions in the O axial direction between the inserts A of the other of these adjacent insert rows. Here, if the insert rows shown in FIG. 3 are taken from the left side as first through fourth insert rows S1 through S4, then, in FIG. 3, three inserts A are mounted with a gap between each one on the rearward side in the O axial direction of an insert B which is mounted at the tip of the distal end of the first insert row S1. These are taken as inserts A11, A12, and A13 in this order form the distal end side. In the same way, two inserts A21 and A22 are mounted with a gap between each one on the rearward side in the O axial direction of an insert C which is mounted at the tip of the distal end of the second insert row S2, three inserts A31, A32 and A33 are mounted with a gap between each one on the rearward side in the O axial direction of an insert B which is mounted at the tip of the distal end of the third insert row S3, and two inserts A41 and A42 are mounted with a gap between each one on the rearward side in the O axial direction of an insert C which is mounted at the tip of the distal end of the fourth insert row S4. These inserts are positioned so as to be offset from each other in the O axial direction in insert rows which are adjacent to each other in the circumferential direction.

Furthermore, the waveform cutting edges 15 which face towards the outer circumferential side of the distal end insert A11 from among the inserts A in the first insert row S1 are placed such that the positions in the O axial direction of the distal end and rear end thereof match, in this sequence moving rearwards, those of the respective waveform cutting edges 15 of the distal end insert A41 from among the inserts A of the fourth insert row S4, the second insert A32 from the distal end from among the inserts A of the third insert row S3, the second insert A42 from among the inserts A of the fourth insert row S4, and the third insert A33 from among the inserts A of the third insert row S3, and are positioned so as to be continuous on a rotation trajectory around the axis O, so that a first waveform cutting edge row is created by these waveform cutting edges 15. Meanwhile, the respective waveform cutting edges 15 of the inserts A other than the above inserts A, namely, of the distal end insert A31 of the third insert row S3, the distal end insert A21 of the second insert row S2, the second insert A12 from the distal end of the first insert row S1, the second insert A22 of the second insert row S12, and the third insert A13 of the first insert row S1 are also continuous in the same way in this sequence on a rotation trajectory around the axis O so as to create a second waveform cutting edge row.

In addition, in the present embodiment, these first and second waveform cutting edge rows are positioned such that the phases thereof are offset by half the wavelength of the waveform of each waveform cutting edge 15. Accordingly, in the present embodiment, a structure is employed in which two waveform cutting edge rows having mutually different phases are formed on the outer circumference of the end mill body 1. Note that in the above described group of the inserts A, the inserts A11 and A31 at the distal end of the first and third insert rows S1 and S3 which are positioned behind the inserts B which have shorter long sides are positioned so as to be offset by approximately one insert A on the distal end side of the inserts A21 and A41 at the distal end of the second and fourth insert rows S2 and S4 which are positioned behind the inserts C which have longer long sides. Furthermore, the insert A31 which forms part of the second waveform cutting edge row is positioned half the wavelength of a waveform cutting edge 15 on the distal end side of the insert A11 which forms part of the first waveform cutting edge row.

Accordingly, in the present embodiment, any one insert A included in the group is positioned so as to form a particular waveform cutting edge row with at least one insert A of another insert row which is adjacent in the circumferential direction to the insert row where this any one insert A is located. Namely, the rear end of the waveform cutting edge 15 of the insert A11 of the first insert row S1 is continuous with the insert A41 of the fourth insert row S4 to which it is adjacent on the side of the rotation direction T, and both ends of the waveform cutting edges 15 of the inserts A41 and A42 of the fourth insert row S4 are continuous with the inserts A32 and A33 of the third insert row S3 to which they are adjacent in the rotation direction T, so as to form the first waveform cutting edge row. In the second waveform cutting edge row as well, the waveform cutting edge 15 of the insert A31 at the distal end of the third insert row S3 is continuous with the insert A21 of the second insert row S2 to which it is adjacent on the side of the rotation direction T in the circumferential direction, and the inserts A21 and A22 of the second insert row S2 are continuous with the inserts A12 and A13 of the first insert row S1 to which they are adjacent in the rotation direction T.

In contrast to this, in the present embodiment, in the first insert row S1 of the inserts A included in the group, the insert A11 at the distal end thereof forms part of the first waveform cutting edge row, while the other inserts A12 and A13 form part of the second waveform cutting edge row. Conversely, the insert A31 at the distal end of the third insert row S3 forms part of the second waveform cutting edge row, while the other inserts A32 and A33 form part of the first waveform cutting edge row. Thus, an insert A which makes up part of a different waveform cutting edge row from the other inserts A is placed in at least one insert row. In the present embodiment, because the inserts A included in the group are all formed with the same shape and size, in order to form this type of layout, the gaps in the O axial direction between the inserts A11 and A12 and between the inserts A12 and A13 in the first insert row S1, and also the gaps in the O axial direction between the inserts A31 and A32 and between the inserts A32 and A33 in the third insert row S3, namely, the gaps between the insert mounting seats 3 are all made different sizes.

Note that in the pair of inserts C that are placed at the distal end of the inserts A21 and A41 in the above described second and fourth insert rows, the waveform cutting edges 15 which face towards the outer circumferential side are positioned such that sides thereof where the phases of the obtuse angle corner cutting edge portions 15b are mutually different are made to face towards the outer circumferential side. Namely, as is shown in FIG. 3, the insert C at the tip of the distal end of the second insert row S2 is mounted such that the above described waveform cutting edge 15A faces towards the outer circumferential side, while the insert C at the tip of the distal end of the fourth insert row S4 is mounted such that the above described waveform cutting edge 15B faces towards the outer circumferential side. Accordingly, in these inserts C, the obtuse angle corner cutting edge portions 15a and 15b of the respective waveform cutting edge portions 15A and 15B are also placed such that the phases thereof are offset by half the wavelength of the waveform of each obtuse angle corner cutting edge portion 15b. Accordingly, two waveform cutting edges having mutually different phases are formed on the outer circumference of the end mill body 1.

Moreover, in the inserts A included in the group, the inserts A11 and A31 of the first and third insert rows S1 and S3 which are positioned on the distal end side are positioned such that the waveform cutting edges 15 thereof are either continuous with or overlap the rotation trajectory of the waveform cutting edges 15A and 15B of the inserts C at the tip of the distal ends of the second and fourth insert rows S2 and S4. Namely, the insert A11 of the first insert row S1 is positioned such that the distal end of the waveform cutting edge 15 thereof and the rear end of the waveform cutting edge 15B (i.e., the rear end of the obtuse angle corner cutting edge portion 15b) of the insert C of the fourth insert row S4 which is located on the rotation direction T side have mutually matching phases on the rotation trajectory. Moreover, the insert A31 of the third insert row S3 is positioned such that the distal end of the waveform cutting edge 15 thereof and the apex portion of the raised portion 19 on the obtuse angle corner portion 20b side of the obtuse angle corner cutting edge portion 15b of the insert C at the tip of the distal end of the fourth insert row S4 match each other on the rotation trajectory, and this insert C and the insert C at the tip of the distal end of the second insert row S2 are positioned such that the waveform cutting edges 15 overlap each other.

Accordingly, in a roughing end mill having the above described structure, some the inserts A included in the inserts A through C which make up the plurality of insert rows S1 through S4 are positioned so as to be offset from each other in the O axial direction in insert rows S1 through S4 which are adjacent in the circumferential direction, and waveform cutting edges 15 which undulate in the O axial direction protrude from the outer circumferential side of each end mill body 1. As a result, it is naturally possible to cut chips into fragments by means of the inserts A which are separated from each other in the O axial direction in the insert rows S1 through S4, and it is also possible to fragment and create the chips themselves which are created in each of the inserts A, and it is possible to achieve a reduction in the cutting resistance and an improvement in chip processability.

Furthermore, in this portion of the inserts A, the waveform cutting edges 15 thereof make up a waveform cutting edge row in which the phases of the respective waveform cutting edges 15 are continuous along a rotation trajectory around the axis, and a plurality of (two in the present embodiment) these waveform cutting edge rows having mutually different phases are formed on the outer circumference of an end mill body. As a result, it is possible to obtain a smooth processing surface by, for example, using the raised portions of a second waveform cutting edge row to cut the raised portions of an opposite-phase waveform cross section which have been formed on a work processing surface by a first waveform cutting edge row. Accordingly, according to the above described roughing end mill, in spite of the processing being only coarse processing, it is possible to perform comparatively smooth, high quality cutting of a processing surface.

Moreover, in the inserts A of the present embodiment, the waveform cutting edges 15 present a waveform cutting edge shape as a result of a plurality of the groove portions 18 and raised portions 19 which reach as far as the flank face 14 being formed alternatingly on the rake face 12 which faces in the rotation direction T of the end mill body 1. Accordingly, in a roughing end mill which has been fitted with these inserts A, the waveform cutting edges 15 undulate up and down in the circumferential direction while facing towards in the O axial direction. Because of this, in this waveform cutting edge 15, because a work piece is gradually cut away by the apexes of the raised portions 19 thereof, it is possible to alleviate the impact during this cutting away, and it is possible to achieve a reduction in resistance and a suppression of chatter vibration.

Furthermore, in the inserts A of this embodiment, at least one groove portion 18 from among the groove portions 18 and raised portions 19 making up a waveform cutting edge 15 is formed as the groove portion 18B which has a deeper groove depth than the other groove portions 18. As a result, even when, for example, a work piece is cut such that the thickness of the chips becomes thicker from a thin portion, as is the case in up-cut shearing, it is possible to reliably fragment and process these chips by means of the deep groove portions 18B. Moreover, in the present embodiment, because these deep groove portions 18B are formed in a center portion of a cutting edge 15, it is possible to achieve an even greater improvement in the chip processing performance without causing any variation in the width of the fragmented chips. Meanwhile, because the other groove portions 18 are formed as the shallow groove portions 18A which have a shallower groove depth, by forming this deep groove portion 18B in this manner, it is possible to prevent the strength of the inserts A being reduced any more than is necessary.

Note that in the present embodiment a structure is employed in which four insert rows S1 through S4 are formed on the outer circumference of the end mill body 1, and two, namely, the first and second waveform cutting edge rows whose phases are mutually offset from each other by half the wavelength of the waveform cutting edges 15 are formed by the inserts A which are positioned in these insert rows S1 through S4, however, it is also possible to form more than four insert rows. For example, it is possible to form six insert rows and create three waveform cutting edge rows whose phases are offset by one third of a wavelength, or to form eight insert rows and create four waveform cutting edge rows whose phases are offset by one quarter of a wavelength. The smaller the difference between the offset phases, the more smooth the processing surface becomes. However, if, for example, eight insert rows are formed in this manner, then it is also possible to form a layout in which the layout shown in FIG. 3 is simply repeated.

Moreover, in the present embodiment, the inserts B and C are mounted respectively at the tips of the distal end of the respective insert rows S1 through S4 in addition to the inserts A included in the group, and these inserts B and C are positioned such that the rotation trajectories around the axis O of the cutting edges 15 thereof which are facing towards the outer circumferential side partially overlap, and such that the rotation trajectories of the cutting edges 15 thereof which form bottom blades also overlap. In addition, the cutting edges 15 thereof which form side blades also have a waveform cutting edge shape, and the phases thereof are also mutually offset from each other by half a wavelength in the inserts B and C.

Because of this, even when, for example, a processing surface having an L-shaped cross section is being formed in a work piece, it is possible to prevent an excessive load being applied to the inserts B and C at the tip of the distal end, and the chips which are created by the cutting edges 15 which form a bottom blade can also be efficiently fragmented and processed. Furthermore, a bottom surface of the L-shaped processing surface which is formed by this can also be made to a high quality. It should be noted that, in the present embodiment, the inserts B and C which are different from the inserts A are placed at the tip of the distal ends of the insert rows S1 through S4 in this manner, however, when, for example, only a side surface of a work piece is to be cut, all of the inserts which are placed on the end mill body 1 and form an insert row may be the above described inserts A which form a plurality of waveform cutting edge rows.

Furthermore, in the present embodiment, the inserts A included in the group whose waveform cutting edges 15 form the above described plurality of waveform cutting edges rows are positioned such that any one insert A and at least one insert A from another insert row which is adjacent in the circumferential direction to the insert row in which this any one insert A is placed have waveform cutting edges 15 whose phases match each other on the rotation trajectory, and form a continuous waveform cutting edge row.

Accordingly, immediately after the waveform cutting edge 15 of the insert A which is positioned on the rotation direction T side from among inserts A whose waveform cutting edges are continuous has cut a processing surface, the waveform cutting edges 15 of the insert A on the rearward side of this in the rotation direction T cut this work surface. As a result, even if the feed rate of the end mill body 1 is speeded up, the waveform cross sections having opposite phases which are transferred onto the work piece processing surface can be prevented from undergoing large shifts in this feed direction. In addition, because this cross section is further cut in the same way by subsequent cutting edges 15 whose phases are mutually offset in different waveform cutting edge rows, according to the present embodiment, a smooth processing surface can be obtained more reliably.

Furthermore, in the present embodiment, the inserts A11, A32, and A33 which make up the first waveform cutting edge row and the inserts A31, A12, and A13 which make up the second waveform cutting edge row are mixed together in some the insert rows S1 and S3, and the sizes of the gaps in the O axial direction are formed different between the inserts A which make up these different waveform cutting edge rows, namely, the gaps between the insert mounting seats 3 are formed at different sizes. However, it is possible to employ a structure in which, even when inserts A which make up different waveform cutting edge rows are mixed together in a single insert row, for example, by leaving the gaps between the insert mounting seats 3 as they are, and preparing a plurality of different types of inserts A in which the actual phases themselves of the waveform cutting edges 15 are different, a plurality of waveform cutting edge rows can be formed. However, this point has the problem that, at this time, there is an increase in the number of insert types that are placed on a single end mill body 1 so that the control and handling thereof become more complex, and there is also an increase in insert manufacturing costs.

Therefore, as is described above, in the present embodiment, the inserts A11 and A31 which make up a different waveform cutting edge row from the other inserts A12, A13, A32, and A33 which are placed in the same insert rows S1 and S3 are positioned such that the gaps in the O axial direction between these and the adjacent inserts A12 and A32 are different sizes between the other inserts A12 and A13 and the other inserts A32 and A33. As a result, it is possible to make all of the inserts A the same shape and size.

Accordingly, according to the present embodiment, it is possible to reduce to a minimum the types of inserts A through C which are mounted on an end mill body 1, and simplify the control and handling thereof. In addition, a reduction in the manufacturing costs of the inserts A can be achieved.

However, by not placing inserts A which form mutually different waveform cutting edge rows in the same insert row, but instead, for example, switching the positions of the insert A11 and the insert A31 in FIG. 3, then the waveform cutting edges 15 of the inserts A in a single insert row can be made to form the same waveform cutting edge row. In this case, it is possible to make the intervals between the insert mounting seats 3 the same in each of the insert rows S1 through S4.

INDUSTRIAL APPLICABILITY

The present invention relates to a roughing end mill which includes: an end mill body which is rotated around an axis; and a plurality of inserts which are placed on an outer circumference of the end mill body a predetermined distance apart from each other in the direction of the axis, wherein the plurality of inserts form insert rows of which a plurality are provided in a circumferential direction of the end mill body, and at least the inserts included in a group are positioned so as to be offset in the axial direction from each other in the different insert rows which are mutually adjacent in the circumferential direction, and the inserts included in the group are provided with cutting edges which face towards an outer circumferential side of the end mill body and which are formed as waveform cutting edges which undulate as they move in the axial direction, and one insert of one insert row of the inserts included in the group and an insert of another insert row which is offset therefrom in the axial direction among the inserts included in the group are positioned such that the waveform cutting edges of each of these inserts make up a waveform cutting edge row whose phase is continuous on a rotation trajectory around the axis, and a plurality of these waveform cutting edge rows which have mutually different phases are formed on the outer circumference of the end mill body. According to the roughing end mill of the present invention, it is possible to form a high-quality processing surface while achieving a sufficient reduction in resistance and improvement in chip processability.

The invention claimed is:

1. A roughing end mill comprising:
   an end mill body which is rotatable around an axis of the end mill body; and
   a plurality of inserts which are placed on an outer circumference of the end mill body at a predetermined distance from each other in the direction of the axis of the end mill body, wherein
   the plurality of inserts form a plurality of insert rows which are provided in a circumferential direction of the end mill body,
   at least the inserts, excluding the inserts at a tip of a distal end of an insert row, are positioned so as to be offset in the direction of the axis of the end mill body from each other in the different insert rows which are mutually adjacent in the circumferential direction,
   the inserts, excluding the inserts at a tip of a distal end of an insert row, are provided with waveform cutting edges which face towards an outer circumferential side of the end mill body,
   the waveform cutting edges have an arc shape made up of smoothly continuous concave curves and convex curves,
   a first row of a plurality of insert rows includes first inserts, a second row of a plurality of insert rows includes second inserts which are shifted in the direction of the axis of the end mill body with respect to the first inserts such that the waveform cutting edges of the adjacent first inserts and the waveform cutting edges of the adjacent second inserts do not overlap and form a first waveform cutting edge row whose phase is smoothly continuous on a rotation trajectory of the first and second inserts around the axis of the end mill body,
   a third row of a plurality of insert rows includes third inserts, a fourth row of a plurality of insert rows includes fourth inserts which are shifted in the direction of the axis of the end mill body with respect to the third inserts such that the waveform cutting edges of the adjacent third inserts and the waveform cutting edges of the adjacent fourth inserts do not overlap and form a second waveform cutting edge row whose phase is smoothly continuous on a rotation trajectory of the third and fourth inserts around the axis of the end mill body,
   outlines of the first and second waveform cutting edge rows are identical,
   profiles of the rotation trajectories of the first and second waveform cutting edge rows are out of alignment with each other in the direction of the axis of the end mill body,
   the waveform cutting edges of the first, second, third and fourth inserts have the same shape and size as each other and have waveform shapes with a uniform wavelength, and
   the rotation trajectory of the first inserts partially overlap the rotation trajectory of the third inserts in the direction of the axis of the end mill body.

2. The roughing end mill according to claim 1, wherein the one insert is positioned so as to form the waveform cutting edge row together with at least one insert from the other insert row which is adjacent in the circumferential direction to the one insert row.

3. The roughing end mill according to claim 1, wherein the inserts, excluding the inserts at a tip of a distal end of an insert row, have the same shape and size, and an insert which makes up a different waveform cutting edge row from that of the other inserts is placed in at least one insert row, and this insert is positioned at a different sized gap in the direction of the axis of the end mill body from the other inserts.

4. An insert for a roughing end mill which is placed in the roughing end mill according to claim 1, excluding the inserts at a tip of a distal end of an insert row, wherein
   the waveform cutting edges are formed on an intersecting ridge line portion between a rake face which faces in the rotation direction of the end mill body and a flank face which intersects with this rake face and faces towards the outer circumferential side of the end mill body,
   the waveform cutting edges are formed by a plurality of groove portions and raised portions formed alternatingly along the waveform cutting edges on the rake faces and extending as far as the flank faces thereof,
   the waveform cutting edges have a broadly circular arc shape made up of smoothly continuous concave curves and convex curves, and
   at least one of the groove portions is formed as a deep groove portion which has a deeper groove depth than the other groove portions.

5. A roughing end mill comprising:
   an end mill body; and
   a plurality of inserts which are removably mounted apart from each other in the circumferential direction on an outer circumference of the end mill body which rotates around an axis thereof, wherein
   at least two of the inserts according to claim 4, which are formed having the same shape and size, are mounted at equal intervals in the axial direction with one or more portions which are mutually asymmetrical of the rotationally symmetrically positioned waveform cutting edges made to overlap each other on a rotation trajectory around the axis.

6. The roughing end mill according to claim 1, wherein all of the inserts included in the first, second, third and fourth rows, except for the inserts at a tip of a distal end of the rows, are out of alignment with each other in the direction of the axis of the end mill body.

7. The roughing end mill according to claim 1, wherein the profiles of the rotation trajectories of the first and second waveform cutting edge rows are offset by half the wavelength of the waveform of each waveform cutting edge.

* * * * *